United States Patent [19]
Carroll et al.

[11] 4,072,360
[45] Feb. 7, 1978

[54] HYDRAULIC PRESSURE BRAKE SYSTEM WITH SPRING APPLY PRESSURE RELEASE PARKING BRAKE MODE

[75] Inventors: Luther E. Carroll, Dayton, Ohio; James C. Clement, Troy, Mich.

[73] Assignee: General Motors Corporation, Detroit, Mich.

[21] Appl. No.: 769,222

[22] Filed: Feb. 16, 1977

Related U.S. Application Data

[63] Continuation-in-part of Ser. No. 689,457, May 24, 1976, abandoned.

[51] Int. Cl.² .............................................. B60T 13/22
[52] U.S. Cl. ...................................... 303/2; 188/170; 303/9; 303/71
[58] Field of Search ................... 60/548; 91/413, 431; 92/61, 63, 64, 130; 188/152, 170; 303/2–4, 6 M, 7, 9–13, 15, 50, 52, 56, 71, 114, 116

[56] References Cited

U.S. PATENT DOCUMENTS

| | | | |
|---|---|---|---|
| 3,582,150 | 6/1971 | Williams | 303/10 X |
| 3,694,038 | 9/1972 | Ingram et al. | 303/114 X |
| 3,699,680 | 10/1972 | Shellhause | 91/431 X |
| 3,768,608 | 10/1973 | Fullmer | 188/170 |
| 3,858,488 | 1/1975 | Newstead et al. | 188/170 X |
| 3,885,458 | 5/1975 | Wright | 92/130 X |
| 3,893,549 | 7/1975 | Bennett | 188/170 |
| 3,896,706 | 7/1975 | Newstead et al. | 92/130 X |
| 3,908,804 | 9/1975 | Cochran | 188/170 |
| 3,943,829 | 3/1976 | Newstead et al. | 188/170 X |
| 3,943,830 | 3/1976 | Sugiura | 92/63 |
| 3,974,899 | 8/1976 | Mita et al. | 303/13 X |
| 4,003,606 | 1/1977 | Plantan | 303/9 |

*Primary Examiner*—Duane A. Reger
*Attorney, Agent, or Firm*—D. D. McGraw

[57] ABSTRACT

Back pressure from the hydraulic power brake assembly of a vehicle acts on brake actuators to hold off spring apply brake assemblies through a vehicle operator actuated control valve. When the parking brakes are to be actuated, the operator turns the control valve so that it vents the hydraulic hold-off chambers to the hydraulic power brake sump, permitting the springs to apply the parking brakes. The hydraulic service brake system includes pistons in the brake actuators for normally actuating the brakes under pressure generated by the hydraulic power brake assembly. The pistons are mechanically acted upon by the spring apply forces when the parking brakes are actuated. The parking brake mode therefore uses the same wheel brake elements as does the service brake mode.

5 Claims, 4 Drawing Figures

HYDRAULIC PRESSURE BRAKE SYSTEM WITH SPRING APPLY PRESSURE RELEASE PARKING BRAKE MODE

This is a continuation-in-part of application Ser. No. 689,457, filed May 24, 1976, now abandoned.

The invention relates to a hydraulic vehicle braking system and more particularly to one in which the wheel brakes are subject to energization by brake actuators so that they selectively function as service brake or parking brake actuators. The parking brake mode is utilized on the vehicle rear wheels in the system illustrated. The hydraulic power system is of the open-center brake booster type so that hydraulic fluid is normally circulated through the system only at sufficient pressure to provide for such circulation. There is a normal back pressure from the hydraulic brake booster which is utilized to hold-off a parking brake apply spring in each actuator. In normal operation the vehicle will have the parking brake mode in the released position due to pressure hold-off. The actuators are selectively actuated for service brake operation by operation of the hydraulic brake booster. When it is desired to actuate the parking brake mode, the vehicle operator moves a control valve which disconnects the brake booster back pressure from the spring hold-off portions of the actuators and connects that portion of the actuators to the sump for the system, thereby releasing the springs and permitting them to mechanically apply the wheel brakes to which the actuators are connected.

In one modification the control valve selectively directs the hydraulic brake booster exhaust back pressure to the parking brake release portion of the actuator or vents that portion of the actuator to the sump. In another modification a normally closed diverter valve is provided to selectively direct the hydraulic brake booster exhaust back pressure directly to the sump or through a check valve, a hand control valve, and a relay valve to the parking brake release section of the actuator. When so directed for release purposes, the pressure acts on the pilot pressure inlet of the diverter valve so that at a predetermined releasing pressure the diverter valve diverts further back pressure and flow to the reservoir. The check valve prevents pressure loss in the release portion of the system. A relief valve is provided to limit the maximum amount of release pressure delivered to the parking brake release section. The relay valve acts in response to pressure changes at its pilot pressure port under control of the hand control valve to vent parking brake release pressure from the actuators to the reservoir when it is desired to apply the parking brakes by spring pressure, and to connect the releasing pressure to the actuators when the parking brakes are to be released. A modified actuator is also illustrated in which the service brake operator section acts in parallel with the parking brake operator section to move the output member to apply the brakes. Thus the parking brake apply force is not transmitted through the service brake piston to the output member.

IN THE DRAWINGS

Figure 1:
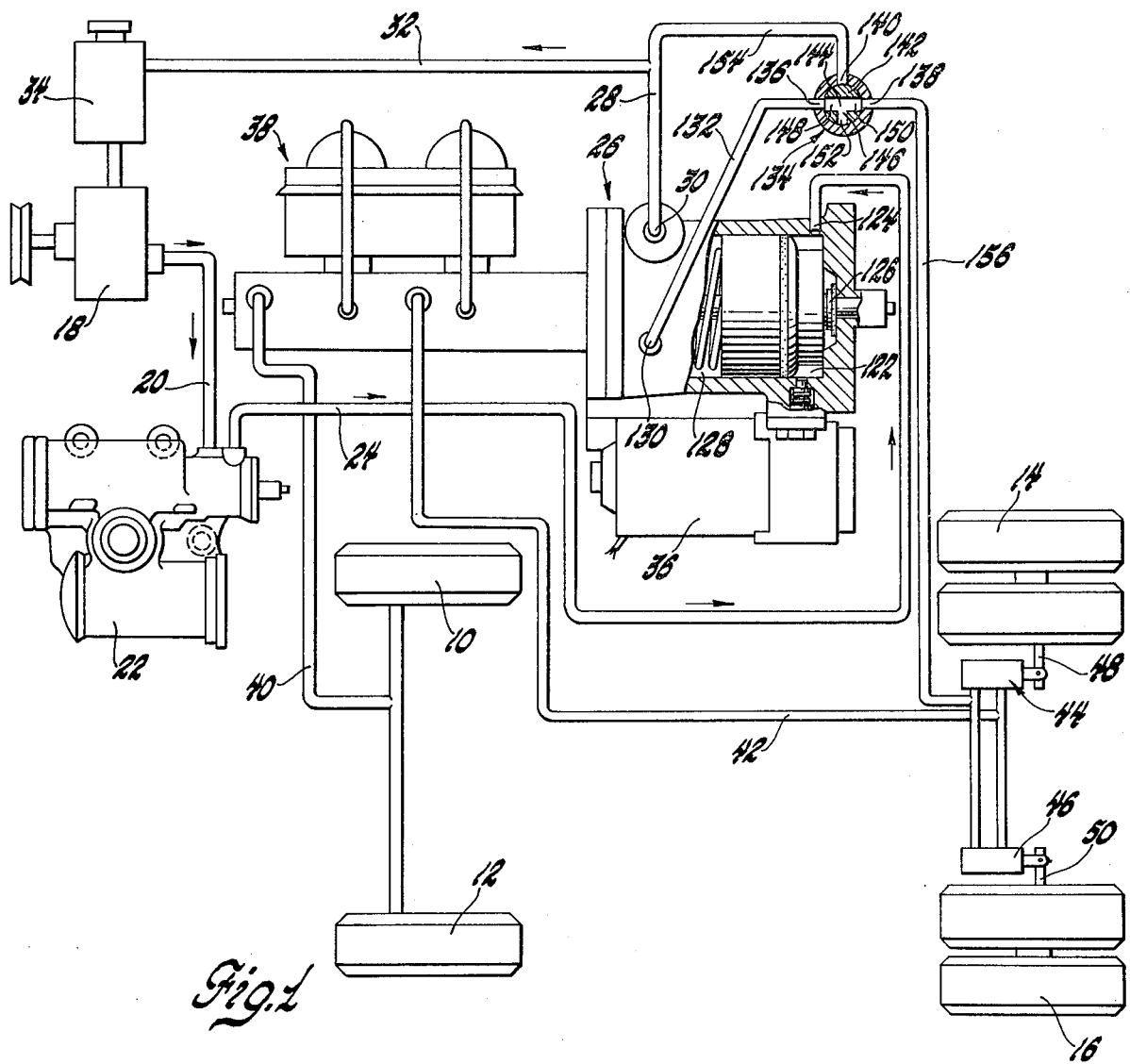
FIG. 1 is a schematic illustration of a vehicle hydraulic pressure brake system embodying the invention and having parts broken away and in section.

The vehicle system shown in FIG. 1 is used on a vehicle having front wheels 10 and 12 and rear wheels 14 and 16. The hydraulic system is of the central or combined type in which the pump 18 delivers hydraulic fluid through a conduit 20 to an open-center type power steering gear 22, then through conduit 24 to the hydraulic brake booster 26. Brake booster 26 is of the open-center type and, by way of example, may be a booster such as that disclosed in U.S. Pat. No. 3,699,680, issued Oct. 24, 1972 and entitled "Hydraulic Power Brake Booster And Open Center Control Valve Therefor". Other types of open-center hydraulic brake boosters may be used. The fluid circulates through the booster 26, passing to conduit 28 through outlet 30. Conduit 28 is connected to conduit 32, which returns the hydraulic fluid to the pump reservoir or sump 34. Reservoir 34 therefore acts as the sump for the brake booster 26 as well as for the power steering gear 22.

The brake booster 26 is illustrated as having an electro-hydraulic pump 36, as disclosed in the above-noted patent, which will supply brake fluid to the booster should pump 18 be unable to do so. The booster is connected to operate a master cylinder assembly 38 of the dual pressurizing type. The front chamber of the master cylinder assembly 38 is illustrated as being connected through conduit 40 to the front wheel brakes for wheels 10 and 12. The rear pressurizing chamber of the master cylinder assembly 38 is illustrated as being connected through conduit 42 to the rear wheel brake actuators 44 and 46 for the rear wheel brakes 48 and 50 associated with rear wheels 14 and 16, respectively.

Figure 2:
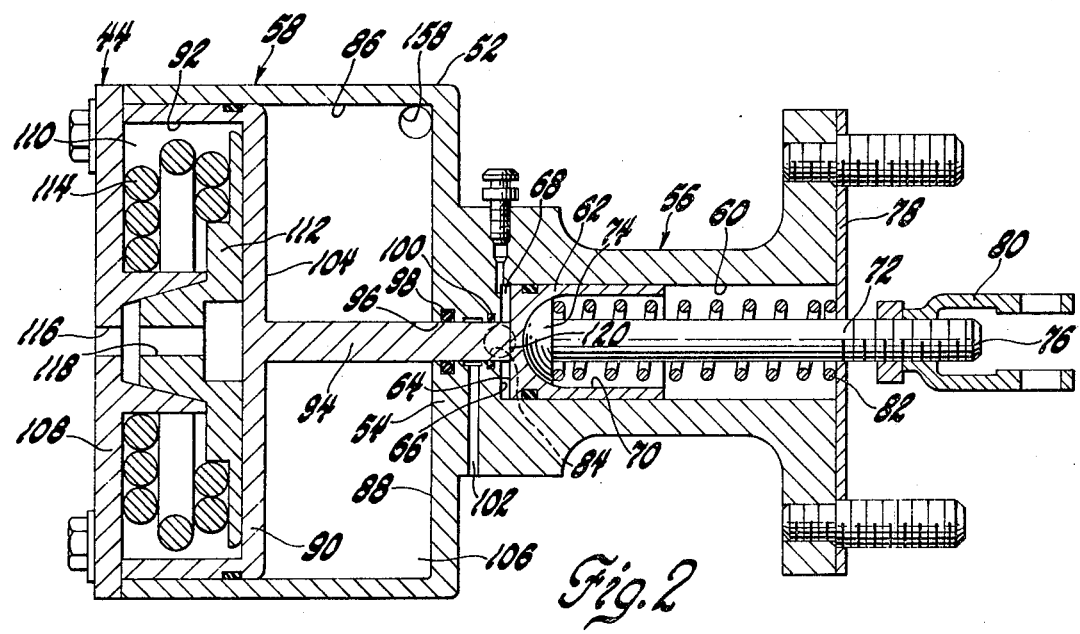
FIG. 2 is a cross-section view of the wheel brake actuator of FIG. 1.

Actuator 44 is illustrated in greater detail in FIG. 2, and actuator 46 is similarly constructed. Actuator 44 has a housing 52 divided by a wall 54 into a service brake operator section 56 and a parking brake operator section 58. The service brake operator section 56 includes a cylinder 60 formed in housing 52 and containing therein a wheel cylinder piston 62. Piston 62 is reciprocably and sealingly received in cylinder 60. The end surface 64 of piston 62 defines, with a portion of cylinder 60 including cylinder end wall surface 66, a wheel cylinder pressure chamber 68. Surface 66 is one side of wall 54. Piston 62 is generally cup-shaped, being formed with a recess 70 which opens in the direction opposite chamber 68. An output member 72 has one end 74 received in recess 70 and abutting the bottom of the recess so that movement of the piston can be transmitted to the output member. The other end 76 of output member 72 extends through a cylinder cover plate 78 and outwardly of cylinder 60. A clevis 80 is attached to output member end 76 to provide mechanical attachment to the wheel brake 48 for brake operation by axial movement of the output member 72 in the rightward direction as viewed in FIG. 2. A piston return spring 82 is received in cylinder 60 about output member 72. One spring end engages cover plate 78 and the other spring end engages output member end 74 to urge the output member, and therefore piston 62, leftwardly in cylinder 60. The conduit 42 is connected to pressure chamber 68 at port 84 to deliver brake actuating pressure from the master cylinder assembly 38.

The parking brake operator section 58 includes a cylinder 86 formed in housing 52 and of much larger diameter than cylinder 60. The other side of wall 54 from end wall surface 66 defines the end wall surface 88 of cylinder 86. A piston 90 is sealingly and reciprocably received in cylinder 86, the piston being generally cup-shaped to define a piston recess 92 extending in a direction away from end wall surface 88. An output member 94 is either connected to or forms an integral part of piston 90 and extends through an aperture 96 in wall 54 so that it is in axial alignment with piston 90, piston 62, and output member 72. Axially spaced seals 98 and 100 in aperture 96 prevent fluid leakage between cylinders 60 and 86. In addition, a vent 102 opening to atmosphere is provided between seals 98 and 100 to assure no pressure or fluid transfer between the two cylinders. Since dissimilar fluids may be used in the brake booster system and in the master cylinder actuating system, vent 102 also prevents any mixture of the two fluids. The piston end surface 104 of piston 90 cooperates with cylinder 86 and end wall surface 88 to define a pressure chamber 106. A cover 108 for the open end of cylinder 86 is secured to housing 52 and cooperates with piston recess 92 and cylinder 86 to define a spring chamber 110. A spring seat 112 is received in chamber 110 and abuts piston 90 at the bottom of recess 92. Spring 114 is received in chamber 110 and is a high rate compression spring or spring pack made of several springs. It acts against cover 108 and spring seat 112 to continually urge piston 90 rightwardly as viewed in FIG. 2. The apertures 116 and 118 in cover 108 and spring seat 112 will provide for the insertion of a suitable tool, well-known in the art, by which the spring seat 112 can be mechanically moved to compress spring 114 to relieve the spring force acting on piston 90 when necessary. It will be noted that the end 120 of output member 94 extends into pressure chamber 68 and is in axially abuttable relation with the end surface 64 of piston 62. When there is no pressure in chamber 68, end 120 engages piston end surface 64 and acts as a stop for piston 62 so that the piston end surface 64 at no time engages the cylinder end surface 66. It can be seen that as output member 94 is moved rightwardly, it will move piston 62 and output member 72 rightwardly in the brake actuating direction. The force of spring 114 is much stronger than the resistance provided by spring 82, permitting this action to occur.

The hydraulic brake booster 26 is illustrated as having a power chamber 122 connected to conduit 24 by an inlet 124. The booster has an open-center control valve mechanism 126 through which fluid entering chamber 122 through inlet 124 flows to exhaust chamber 128. The circulating fluid passes from exhaust chamber 128 to outlet 30 and then to reservoir 34. Outlet 30 is of such a size that there is a slight back pressure contained in exhaust chamber 128. By way of example this pressure may be in the range of 50 to 60 p.s.i. Exhaust chamber 128 has another outlet 130 connected to conduit 132.

A control valve 134 is schematically illustrated as having diametrically opposed ports 136 and 138 and another port 140 positioned circumferentially therebetween. Conduit 132 is connected to port 136. A valve 134 includes a valve barrel 142 schematically illustrated as having a diametrically extending passage 144 and a radially extending passage 146 which intersects passage 144. The opposite ends of passage 144 form ports 148 and 150 while the outer end of intersecting passage 146 forms port 152. The valve barrel 142 may be operated by the vehicle operator. It is illustrated in one of the positions normally used. The position illustrated has ports 136 and 138 respectively communicating with ports 148 and 150, ports 140 and 152 being closed. The valve barrel may be operated counterclockwise as seen in FIG. 1 so that ports 140 and 150 are in communication, as are ports 138 and 152. In this position ports 136 and 148 are closed. A conduit 154 is connected to port 140 and to the juncture of conduits 28 and 32 so that any fluid at port 140 is delivered to the reservoir 34 at reservoir pressure. A conduit 156 connects valve port 138 with the inlet port 158 of pressure chamber 106 in actuator 44. The control valve barrel 142 may also be rotated clockwise from the position shown in FIG. 1 until ports 140 and 148 are in communication, as well as ports 136 and 152. In this position ports 138 and 150 are closed.

When the vehicle is operating normally, pump 18 is circulating fluid through the system from the power steering gear 22 to booster 26 to reservoir 34. The earlier noted back pressure is found in exhaust chamber 128 and conduit 132. The control valve is in the position illustrated. Therefore back pressure is transmitted from exhaust chamber 128 through conduit 132, passage 144, and conduit 156 to actuator pressure chamber 106. Piston 90 is of sufficient size to utilize this back pressure to compress spring 114 to the position shown in FIG. 2. Therefore the spring is not acting to apply rear brake 48. Similarly actuator 46 does not apply rear brake 50.

When the vehicle operator operates the service brakes, he actuates the brake booster 26, generating brake actuating pressure in master cylinder 38. These pressures are transmitted through conduits 40 and 42 to the actuators of the wheel brakes, actuating them. The pressure transmitted through conduit 42 enters actuator pressure chamber 68 through port 84, moving piston 62 rightwardly and causing output member 72 to move rightwardly. This movement actuates the rear wheel brake 48 under control of the vehicle operator. Similarly, actuator 46 actuates rear wheel brake 50. As the operator releases the booster from service brake operation, actuator spring 82 returns output member 72 and piston 62 to the position shown in FIG. 2.

When the operator desires to actuate the rear wheel brakes 48 and 50 as parking brakes, he moves valve barrel 142 counterclockwise as seen in FIG. 1 to provide fluid communication between conduits 156 and 154 through valve passages 144 and 146. This vents pressure chamber 106 to reservoir pressure, which is insufficient to hold piston 90 against the force of spring 114. The spring 114 therefore moves piston 90 rightwardly, causing its output member 94 to move piston 62 and output member 72 rightwardly to actuate rear wheel brake 48. Rear wheel brake 50 is similarly actuated by actuator 46.

When the vehicle operator desires to release the parking brake, he starts the vehicle engine to drive pump 18, thereby generating the back pressure in exhaust chamber 128 of booster 26 as earlier noted. He also moves valve barrel 142 clockwise to the position shown in FIG. 1. As the back pressure increases to its normal level in chamber 128, it will act in actuator chamber 106 to move piston 90 leftwardly, compressing spring 114. This will permit spring 82 to move output member 72 and piston 62 leftwardly in follow-up relation, releasing the rear wheel brake 48. The same action also takes place in actuator 46 to release rear wheel brake 50. It can be seen that so long as the pressure is maintained in chamber 106, the parking brake remains released. If for some reason the operator desires to stop the vehicle but not apply the parking brake, he may move valve barrel 142 clockwise to close port 138, thereby trapping the pressure in conduit 156 and pressure chamber 106. This will hold piston 90 in the position illustrated for a period of time subject to any slight pressure leakage that may occur around valve barrel 142.

When the vehicle is being normally operated with the valve barrel 142 in the position shown in FIG. 1, failure of pump 18 to provide sufficient pressure to the brake booster to maintain the necessary back pressure in chamber 128 will cause the pressure to decrease in actuator pressure chamber 106, causing the rear wheel brakes to be applied. The rear wheel brakes may be manually released by insertion of a suitable tool through apertures 116 and 118 of actuator 44, the tool being operated to engage and then pull spring seat 112 leftwardly to the position shown, thereby permitting the actuator to be positioned as shown in FIG. 2 even though there is no pressure in chamber 106. This arrangement may be needed in order to move the vehicle without pump 18 being operated. It can also be arranged to provide for the introduction of fluid pressure into conduit 156, with port 138 being closed by valve barrel 142, from another pressure source such as an accumulator or an external pressure source to provide for release of the brakes.

Figure 3:
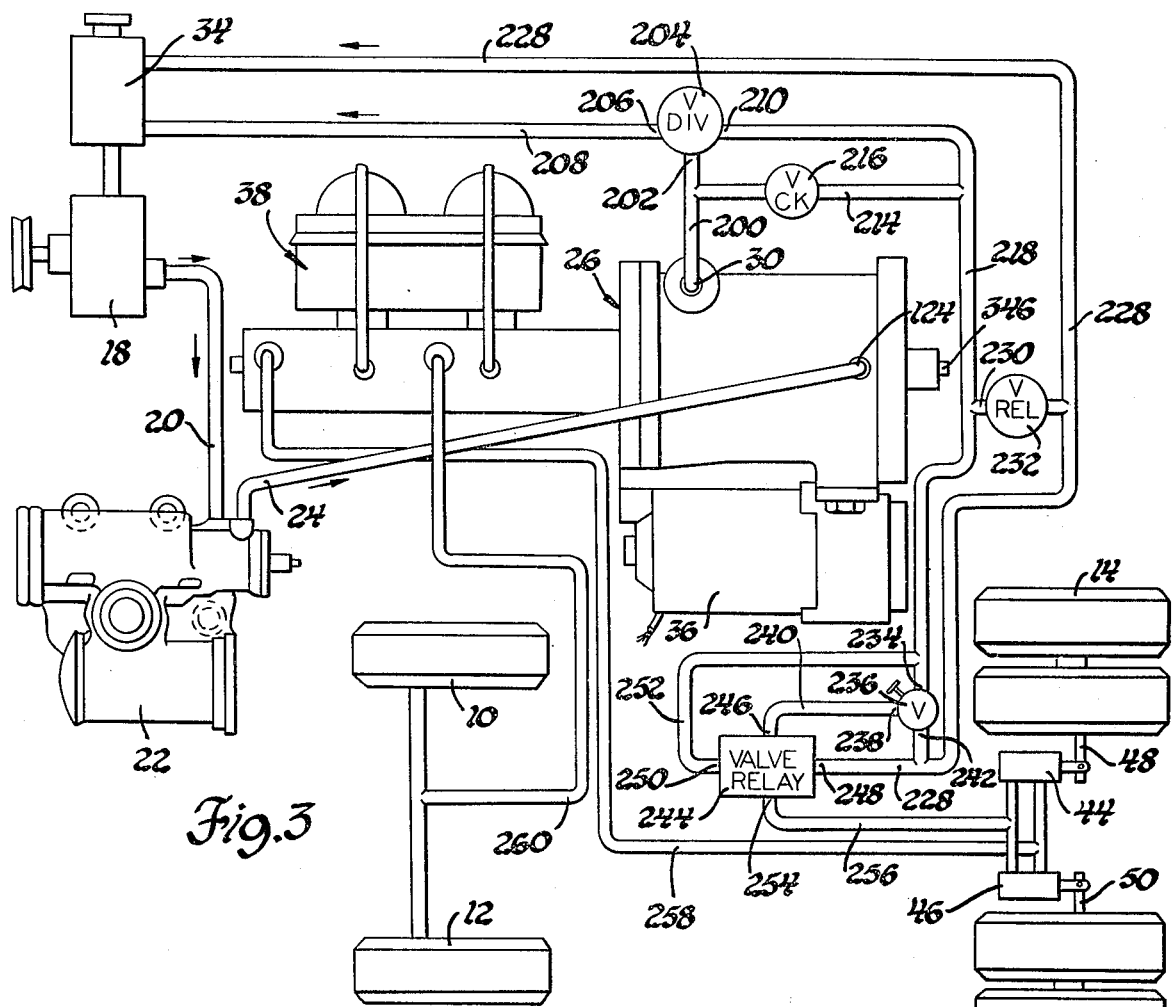
FIG. 3 is a schematic illustration of a modification of the system of FIG. 1.

The modified system shown in FIG. 3 has several elements which are identical to elements in FIG. 1. These include the front wheels 10 and 12, rear wheels 14 and 16, pump 18, conduit 20, power steering gear 22, conduit 24, hydraulic brake booster 26, pump reservoir or sump 34, electro-hydraulic pump 36, master cylinder assembly 38, actuators 44 and 46, and rear brakes 48 and 50. The actuating rod portions of the rear brakes are visible, with the major portions of the brakes and the rear wheels being within the brake drums of the wheels and not further illustrated.

As in FIG. 1, the hydraulic system is of the central or combined type in which the pump 18 delivers hydraulic fluid to the power steering gear 22 and the hydraulic brake booster 26. The fluid enters booster 26 through inlet 124. When neither the power steering gear nor the brake booster is actuated, the fluid flows under relatively low pressure through both of these units since they are both of the open center type. The fluid from the booster 26 flows through outlet 30 and into conduit 200. This conduit is connected to an inlet 202 of a normally closed diverter valve 204. Valve 204 has an outlet 206 connected to a conduit 208 which returns any fluid flowing through it to the reservoir 34 when the valve is open. Valve 204 has a pilot pressure inlet 210 to which the release pressure is connected, as will be described.

A conduit 214 has a check valve 216 in it. One end of conduit 214 is fluid connected to conduit 200 between booster outlet 30 and diverter valve inlet 202. The other end of conduit 214 is connected to a conduit 218. Conduit 218 is connected to the pilot pressure inlet 210 of diverter valve 204. A conduit 230 has a relief valve 232 in it and is connected at one end to conduit 218 and at the other end to conduit 228. Valve 232 will open at a predetermined pressure in conduit 218 to limit the pressure build-up in that conduit. Excess fluid will flow through the relief valve 232 and conduit 228 to reservoir 34.

Conduit 218 is connected to an inlet 234 of a hand control valve 236. Valve 236 has an outlet 238 connected to a conduit 240 and another outlet 242 connected to conduit 228. A relay valve 244 has a pilot pressure inlet 246 to which conduit 240 is connected, an outlet 248 connected with conduit 228, an inlet 250 connected to a conduit 252, and a port 254 connected to a conduit 256. Conduit 252 is continually connected to conduit 218 and conduit 256 is continually connected to a port 158 in the brake actuating mechanism 44 of FIG. 2, or to a similar inlet port of the modified brake actuating mechanism of FIG. 4 described below. In the system shown, an actuator is used for each of the rear brakes 48 and 50 and therefore this connection is provided to both actuators. The service brake portions of the actuators are connected by conduit 258 to receive brake actuating pressure from the master cylinder assembly 38. Conduit 260 connects master cylinder assembly 38 to the front wheel brakes for the wheels 10 and 12 to deliver brake actuating pressure to those brakes.

Figure 4:
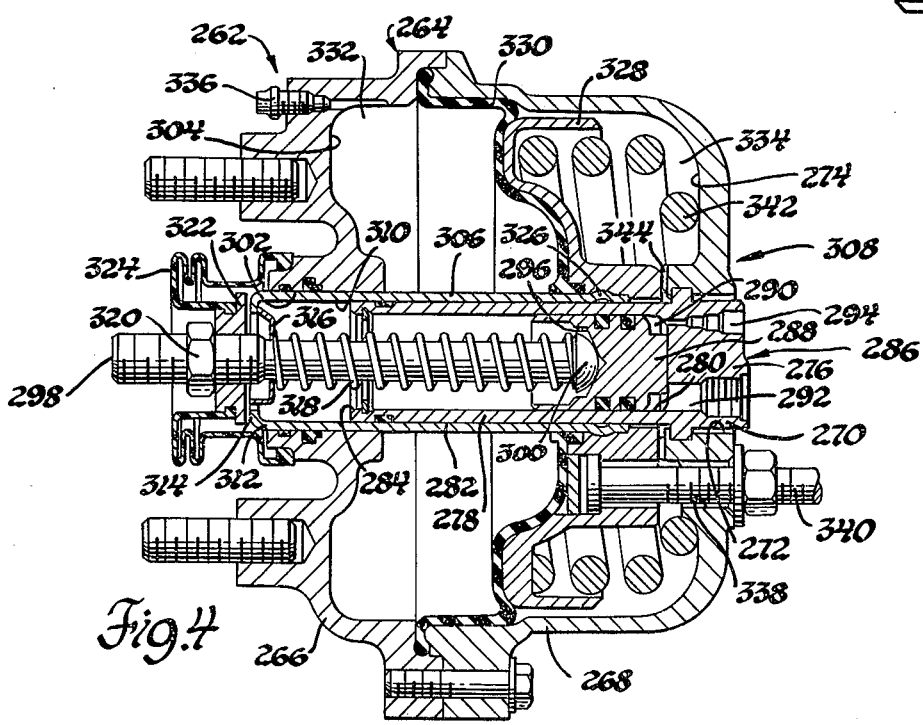
FIG. 4 is a cross-section view of a modified wheel brake actuator usable in either of the systems of FIGS. 1 and 3.

The actuator 262 shown in FIG. 4 accomplishes the same result as actuator 44 of FIG. 2, but has a somewhat different and more compact arrangement. Actuators of this type may be used in place of actuators 44 and 46 in FIGS. 1 and 3. Actuator 262 has a housing 264 defined by two generally cup-shaped housing sections 266 and 268. A cylinder body 270 is mounted through an aperture 272 formed in the end wall 274, which is a part of housing section 268. Cylinder body 270 has an end wall 276 and a tubular extension 278 with inner and outer walls 280 and 282. End wall 276 closes one end of tubular extension 278, while the other end 284 of extension 278 is open. The cylinder body 270 and other parts associated therewith provide the service brake operator section 286. These parts include the service piston 288, which is reciprocably and sealingly received in the cylinder defined by inner cylinder wall 280. A pressure chamber 290 is defined by the end wall 276, piston 288, and a portion of cylinder wall 280. Port 292, formed through end wall 276, opens into chamber 290 and is connected with conduit 42 of FIG. 1 or conduit 258 of FIG. 3 to receive brake actuating pressure from the master cylinder assembly 38. A bleed port 294 is also provided through end wall 276. Piston 288 has a recess 296 in the end opposite chamber 290. The output member 298 has a headed end 300 received in recess 296. The output member 298 extends through the actuator housing section 266 and outwardly so that it is suitably connected to operate the wheel brake with which it is associated. It may be provided with a clevis for this purpose, similar to the actuator 44 of FIG. 2, if desired.

An aperture 302 formed in end wall 304 of housing section 266 sealingly and reciprocably receives an output member 306 from the parking brake operator section 308. Output member 306 is tubular with the inner wall defining a cylinder 310 which sealingly and reciprocably receives the tubular extension 278 so that the outer cylinder wall 282 is immediately adjacent the wall defining cylinder 310. The outer end 312 of output member 306 is formed to provide an inwardly directed annular flange 314 through which output member 298 freely extends. An annular spring seat 316 is received within cylinder 310 and abuts flange 314, with output member 298 passing through the seat. The piston return spring 318 for piston 288 is received about output member 298 with one end abutting head 300 and the other end seating on spring seat 316. Spring 318 therefore continually urges piston 288 to the service brake release position illustrated in FIG. 4. The other end of output member 298 from head 300 is provided with an adjusting nut 320 which positions an abutment collar 322 on the output member 298. Collar 322 is positioned axially outwardly of output member 306 so that the outer end 312 of that member can engage the collar in direct force transmitting relation upon sufficient movement of member 306. A flexible boot 324 is provided to close aperture 302 and prevent the entry of foreign matter. The boot is mounted on a boss through which aperture 302 is formed and is also mounted on the collar 322. The boot is corrugated to permit its extension and retraction with movements of output member 298.

The other end 326 of tubular output member 306 is secured to an annular piston 328 which is reciprocably received within housing 264. Piston 328 has a diaphragm 330 secured to it and to housing 264 so that the diaphragm and piston define a power wall separating housing 264 into a pressure chamber 332 and a spring chamber 334. A port 336 through housing section 266 is connected with conduit 156 of FIG. 1 or conduit 256 of FIG. 3. Spring chamber 334 is vented to atmosphere through one or more apertures 338 in end wall 274. These apertures also accommodate the manual parking brake release bolt assemblies 340. Each assembly 340 is connected in a known manner to piston 328 to provide for manual release of the parking brake when required. A high rate compression spring or spring pack 342 is received in spring chamber 334 and seated on end wall 274 and piston 328. Spring 342 continually urges piston 328 leftwardly in the brake actuating direction. In normal operation the manual release bolt assemblies 340 are not installed, but are readily available if needed. They therefore do not prevent piston 328 from moving leftwardly under the force of spring 342 unless they are inserted and tightened to forcibly move the piston rightwardly against the force of spring 342. A plurality of bolt assemblies 340 may be provided in circumferentially spaced relation as needed to properly release the parking brake manually.

When sufficient pressure is supplied to pressure chamber 332, it will act on the power wall, made up of piston 328 and diaphragm 330, to move the power wall rightwardly against the force of spring 342 until the piston 328 engages a stop 344 formed on end wall 274. With the service brake pressure also released, spring 318 holds piston 288 against end wall 276 as shown in FIG. 4. When service brake actuating pressure is provided in chamber 290 by master cylinder assembly 38, piston 288 moves output member 298 leftwardly against the force of piston return spring 318 to actuate the brakes. Collar 322 will move with output member 298. When the parking brake section is to be actuated, from the release position shown in FIG. 4, pressure is released from chamber 332, and spring 342 expands to move piston 328 and output member 306 leftwardly as seen in FIG. 4. Flange 314 engages collar 322 in abutting relation and further movement causes brake actuating movement of output member 298. Since piston return spring 318 reacts on flange 314 through spring seat 316, it does not have to be compressed. Output member head 300 is merely moved away from piston 288. Spring 342 will hold the brake in the applied position until pressure is again reapplied to chamber 332. If no pressure is available for parking brake release, manual release bolt assemblies 340 are used to retract piston 328 and release the parking brake section.

Actuator 262 has some advantages relative to the actuator in FIG. 2 in that its overall length is considerably shorter and each brake operator section operates independently of the other since they are in parallel and only act to move output member 298 when actuated.

Assuming the vehicle to be parked with the parking brake operator sections of the actuators having the brakes applied in the parking mode, and the vehicle engine not running, the system of FIG. 3 is usually in the following condition. Sufficient brake fluid is trapped under pressure in conduit 218 to hold open the normally closed diverter valve 204. Check valve 216 and relief valve 232 are closed. Hand control valve 236 is so conditioned as to close its port 234 and connect its ports 238 and 242. This causes port 246 of relay valve 244 to be vented to the reservoir 234 through conduits 240 and 228. The relay valve is therefore conditioned to cause fluid communication between its ports 248 and 254 while closing its port 250. Therefore the actuator pressure chambers are vented to the reservoir 34 through conduit 256, relay valve 244, and conduit 228. If for some reason the static pressure trapped in conduit 218 has leaked down, the only difference would be that there is little or no pressure in conduit 218, and the diverter valve 204 is closed, closing its port 202.

When the engine is operated and pump 18 is driven, with diverter valve 204 open, fluid circulates from pump 18 through conduit 20, steering gear 22, conduit 24, booster 26, conduit 200, diverter valve 204, and conduit 208 to reservoir 34. The system is only under sufficient pressure to continue relatively free flow and provide no substantial back pressure to pump 18. If diverter valve 204 is closed for reasons described immediately above, the pump 18 will pump fluid as before until it passes through conduit 200. Since diverter valve port 202 is closed under this condition, the full volume of fluid being pumped is directed through conduit 214 and check valve 216 to conduit 218. Since this conduit is blocked off at all possible points, the pressure immediately rises and is transmitted to the diverter valve pilot pressure port 210, immediately causing the diverter valve to open and connect its ports 202 and 206. Pumped fluid then flows from conduit 200 through the diverter valve 204 to sump 34. The pressure therefore immediately decreases in conduit 200 and check valve 216 immediately closes, trapping the pressurized fluid in conduit 218 at a sufficient pressure to hold diverter valve 204 open. By way of example, this pressure may be approximately 80 p.s.i. Relief valve 232 may be set to open at approximately 120 p.s.i., so it normally remains closed.

When the operator then desires to release the parking brake, he operates hand control valve 236 to disconnect valve ports 238 and 242 and to connect valve ports 234 and 238. The fluid under pressure in conduit 218 is then transmitted through hand control valve 236 and conduit 240 to the pilot port 246 of relay valve 244. To the extent that any volume increase is required while pressure is being so transmitted, the diverter valve 204 may close if the pressure in conduit 218 falls much below 80 p.s.i., momentarily diverting pump flow to recharge conduit 218 to approximately 80 p.s.i. as above described, after which the diverter valve is again opened. The pressure entering relay valve 244 at port 246 causes the relay valve to disconnect its ports 248 and 254, thereby disconnecting the pressure chambers of the actuators from the reservoir 34. The relay valve then connects its ports 250 and 254, permitting flow of fluid under pressure from conduit 218 through conduit 252, relay valve 244, and conduit 256 to the pressure chambers of the actuators. This pressure moves the power walls of the actuators against the parking brake apply springs to release the brakes from the parking mode. Pressure and volume are made up as required in the same manner as described above. Essentially, diverter valve 204 is closed due to decrease in pilot pressure at its port 210, directing all of the fluid volume being pumped into the actuator pressure chambers and increasing the pressure in conduit 218. When the pressure again reaches approximately 60 p.s.i., the actuators are so positioned that the parking brakes are fully released. The pressure in conduit 218 will continue to increase to approximately 80 p.s.i., at which time diverter valve 204 is again opened and the pressure is trapped in the actuator pressure chambers, conduits 218, 252 and 256, and the portions of conduits 214 and 230 in direct fluid communication with conduit 218. Check valve 216 and relief valve 232 are closed. The parking brakes are therefore maintained in the released position.

When it is desired to apply the vehicle brakes 48 and 50 by use of the forces of the parking brake apply springs of the actuators, the vehicle operator only has to move the hand control valve 236 so that it reconnects its ports 238 and 242 while closing its port 234. This immediately vents conduit 240 to the reservoir 34, causing the relay valve to close its port 250 and connect its ports 248 and 254. This immediately vents the actuator pressure chambers to the reservoir 34 and allows the apply springs to expand and energize the brakes 48 and 50.

The diverter valve 204, hand control valve 236 and the relay valve 244 may be commercially available valves. By way of example only, the diverter valve may be valve part No. 277165 currently manufactured and sold by Bendix-Westinghouse. The hand control valve may be valve Model PP-1, also currently manufactured and sold by Bendix-Westinghouse. The relay valve may be valve Model R-3, also currently manufactured and sold by Bendix-Westinghouse. Other commercially available valves which provide the same functions as described herein may be utilized. The check valve 216 may be any suitable check valve which opens under relatively light pressure. By way of example, it may open at any time when the pressure in conduit 200 is from 2 to 10 p.s.i. greater than the pressure in conduit 218. Relief valve 232 may be any suitable valve which opens at approximately 120 p.s.i. differential between conduit 218 and conduit 228. Other pressure values in the system may be utilized as necessary. The pressure figures given herein are only by way of example. However, it is desirable to have the actuators operate in the parking brake release mode at relatively low pressures on the order of 60 to 80 p.s.i. rather than requiring their operation at the higher pressures in the range of 500 to 1000 p.s.i. which are generated when the hydraulic power brake booster 26 is actuated, such pressures being upstream of the booster.

What is claimed is:

1. A hydraulic pressure brake system comprising:
   a power circuit including a pressure actuated booster having a pressurizable power chamber and a hydraulic fluid outlet having a normal back pressure when hydraulic power is available in said circuit for booster operation;
   a brake actuating circuit including a master cylinder powered by said booster and a wheel brake actuator, said actuator having combined service brake operator and spring apply-pressure released parking brake operator sections;
   a wheel brake subject to energization by said actuator to selectively function as a service brake or a parking brake;
   and control means operable in one condition to direct said normal back pressure to said actuator without requiring power actuation of said booster to pressure release said parking brake operator section and operable in another condition to dump the normal back pressure from said actuator to actuate a spring apply portion of said parking brake operator section to energize said wheel brake to function as a parking brake;
   said service brake operator section being actuated by pressure from said master cylinder to apply and release said wheel brake as a service brake when said parking brake operator section is in the pressure released condition.

2. In a brake system including a master cylinder and a fluid pressure operated power brake booster for said master cylinder and having a power pressure chamber and an exhaust pressure chamber and open center control valve means permitting fluid flow therethrough when said booster is inactive and restricting fluid flow therethrough when said booster is actuated, a fluid pressure generating and circulating system connected to deliver fluid to and receive fluid from said booster and having a low back pressure and high power pressure capability; the improvement comprising:
   a brake actuator having first and second cylinders therein separated by a wall, a first piston in said first cylinder defining with said wall a first pressure chamber and having a first output member extending beyond said first cylinder and adapted upon movement in an apply direction to apply a brake and upon movement in a release direction to release the brake, a second piston in said second cylinder defining with said wall a second pressure chamber and having a second output member sealingly extending through an aperture in said wall and axially aligned for force transmitting engagement with said first piston, and spring means in said second cylinder acting on said second piston and urging said second piston toward axially engaging force-transmitting relation with said first piston, said spring means being of sufficient power to actuate the brake when unopposed by fluid pressure in said second pressure chamber;
   first conduit means fluidly connecting said master cylinder and said first pressure chamber for actuating the brake when brake actuating pressure is generated in the master cylinder;
   second conduit means fluidly connecting said brake booster exhaust chamber and said second pressure chamber and having operator operable valve means therein having an outlet fluid connected with the part of said fluid pressure generating and circulating system receiving fluid from said booster;
   said operator operable valve means having a first position fluidly connecting said brake booster exhaust chamber and said second pressure chamber and closing said valve means outlet, and a second position fluidly connecting said second pressure chamber and said valve means outlet and closing the valve means connection with said brake booster exhaust chamber;
   the low back pressure of said fluid pressure generating and circulating system provided in said booster exhaust chamber being sufficient when acting in said second pressure chamber to oppose said spring means and move said second piston away from said first piston independently of actuation of said power brake booster, said brake actuator then being actuatable for service braking by master cylinder generated pressure acting in said first pressure chamber, said spring means upon movement of said operator operable valve means to said second position moving said second piston to exhaust pressure from said second pressure chamber and move said first piston to actuate said brake actuator in a parking brake mode.

3. In a brake system including a master cylinder and a fluid pressure operated power brake booster for said master cylinder and having a power pressure chamber and an exhaust pressure chamber and open center control valve means permitting fluid flow therethrough when said booster is inactive and restricting fluid flow therethrough when said booster is actuated, a fluid pressure generating and circulating system connected to deliver fluid to and receive fluid from said booster and having a low back pressure and high power pressure capability; the improvement comprising:

a brake actuator having first and second cylinders therein separated by a wall, a first piston in said first cylinder defining with said wall a first pressure chamber, a first output member extending beyond said first cylinder and adapted upon movement in an apply direction to apply a brake and upon movement in a release direction to release the brake, a second piston in said second cylinder defining a second pressure chamber and having a second output member axially aligned for operative force transmitting engagement with said first output member, and spring means in said second cylinder acting on said second piston and urging said second piston toward operative axially engaging force-transmitting relation with said first output member, said spring means being of sufficient power to actuate the brake when unopposed by fluid pressure in said second pressure chamber;

first conduit means fluidly connecting said master cylinder and said first pressure chamber for actuating the brake when brake actuating pressure is generated in the master cylinder;

second conduit means fluidly connecting said brake booster exhaust chamber and said second pressure chamber and having operator operable valve means therein having an outlet fluid connected with the part of said fluid pressure generating and circulating system receiving fluid from said booster;

said operator operable valve means having a first position fluidly connecting said brake booster exhaust chamber and said second pressure chamber and closing said valve means outlet, and a second position fluidly connecting said second pressure chamber and said valve means outlet and closing the valve means connection with said brake booster exhaust chamber;

the low back pressure of said fluid pressure generating and circulating system provided in said booster exhaust chamber being sufficient when acting in said second pressure chamber to oppose said spring means and move said second piston away from operative force-transmitting engagement with said first output member independently of actuation of said power brake booster, said brake actuator then being actuatable for service braking by master cylinder generated pressure acting in said first pressure chamber, said spring means upon movement of said operator operable valve means to said second position moving said second piston to exhaust pressure from said second pressure chamber and to operatively move said first output member to actuate said brake actuator in a parking brake mode.

4. A hydraulic pressure brake system comprising:
a power circuit including a hydraulic fluid pump having an outlet and an inlet and a hydraulic fluid reservoir connected with said pump inlet to provide hydraulic fluid to said pump, a pressure actuated booster having a hydraulic fluid inlet operatively connected with said pump outlet to receive hydraulic fluid therefrom, a pressurizable power chamber and a hydraulic fluid outlet having a predetermined normal back pressure when hydraulic power is available in said circuit for booster operation, said booster outlet being connected to at least selectively return hydraulic fluid to said pump reservoir;

a brake actuating circuit including a master cylinder powered by said booster and a wheel brake actuator, said actuator having combined service brake operator and spring apply-pressure released parking brake operator sections;

and control means operable in one condition to direct said normal back pressure to said actuator without requiring power actuation of said booster to pressure release said parking brake operator section and operable in another condition to dump the normal back pressure from said actuator to actuate a spring apply portion of said parking brake operator section;

said control means including a normally closed diverter valve connected to said booster outlet fluidly intermediate said booster outlet and said reservoir and operable to open the fluid connection therebetween; a relay valve having a first port fluid connected to said booster outlet with a check valve therebetween operable to only permit hydraulic fluid flow toward said relay valve from said booster outlet, said relay valve having a second port in continuous fluid communication with said spring apply-pressure released parking brake operator section and a third port in continuous fluid communication with said pump reservoir; an operator operated control valve actuatable to control said relay valve to selectively fluid connect said second relay port with said first relay port to direct said normal back pressure to said actuator as aforesaid or fluid connect said second relay port to said third relay port to dump said normal back pressure from said actuator as aforesaid while said control valve also dumps said normal back pressure passing through said check valve to said reservoir; and means responsive to normal back pressure passed through said check valve to open said diverter valve to said reservoir at a predetermined pressure level sufficient to hold said spring apply-pressure released parking brake actuator section in the released mode, said check valve thereupon closing and trapping hydraulic fluid substantially at said predetermined pressure level;

said service brake operator section of said actuator being actuatable by pressure from said master cylinder when said parking brake operator section is in the pressure released condition.

5. A hydraulic pressure brake system comprising:
a power circuit including a pressure actuated booster having a pressurizable power chamber and a hydraulic fluid outlet having a predetermined normal back pressure when hydraulic power is available in said circuit for booster operation;

a brake actuating circuit including a master cylinder powered by said booster and a wheel brake actuator, said actuator having combined service brake operator and spring apply-pressure released parking brake operator sections;

and control means operable in one condition to direct said normal back pressure to said actuator without requiring power actuation of said booster to pressure release said parking brake operator section and operable in another condition to dump the normal back pressure from said actuator to actuate a spring apply portion of said parking brake operator section;

said service brake operator section of said actuator being actuatable by pressure from said master cylinder when said parking brake operator section is in the pressure released condition.

* * * * *

UNITED STATES PATENT OFFICE
CERTIFICATE OF CORRECTION

Patent No. 4,072,360                    Dated February 7, 1978

Inventor(s) Luther E. Carroll, James C. Clement

It is certified that error appears in the above-identified patent and that said Letters Patent are hereby corrected as shown below:

Column 9, line 32, "R-3" should read -- R-8 --.

Signed and Sealed this

Sixth Day of June 1978

[SEAL]

Attest:

RUTH C. MASON
Attesting Officer

DONALD W. BANNER
Commissioner of Patents and Trademarks